(12) United States Patent
Pellenc et al.

(10) Patent No.: US 9,247,768 B2
(45) Date of Patent: Feb. 2, 2016

(54) LINEAR STALK SEPARATOR WITH ALTERNATING OSCILLATING MOVEMENTS

(75) Inventors: Roger Pellenc, Pertuis (FR); Jean-Marc Gialis, Cheval Blanc (FR)

(73) Assignee: PELLENC (SOCIETE ANONYME), Pertuis (FR)

(*) Notice: Subject to any disclaimer, the term of this patent is extended or adjusted under 35 U.S.C. 154(b) by 1448 days.

(21) Appl. No.: 12/199,728

(22) Filed: Aug. 27, 2008

(65) Prior Publication Data

US 2009/0056297 A1      Mar. 5, 2009

(30) Foreign Application Priority Data

Aug. 30, 2007   (FR) ..................... 07 06084

(51) Int. Cl.
| | |
|---|---|
| *A23N 15/02* | (2006.01) |
| *A23N 15/04* | (2006.01) |
| *A47J 21/00* | (2006.01) |
| *B07B 1/12* | (2006.01) |

(52) U.S. Cl.
CPC ............. *A23N 15/025* (2013.01); *A23N 15/02* (2013.01); *B07B 1/12* (2013.01)

(58) Field of Classification Search
CPC ............ A47J 43/00; A47J 43/26; A23N 5/00; A23N 5/004; A23N 5/006; A23N 5/008; A23N 5/01; A23N 5/03; A23N 5/08; A23N 4/00; A23N 4/02; A23N 4/04; A23N 4/06; A23N 4/08; A23N 4/085; A23N 4/10; A23N 4/12

USPC ........... 99/635, 501–503, 509–513, 520–522, 99/566, 569, 574–576, 593–599, 608, 617, 99/621, 625, 630–634

See application file for complete search history.

(56) References Cited

U.S. PATENT DOCUMENTS

| | | | | |
|---|---|---|---|---|
| 641,266 | A * | 1/1900 | Bussells | 100/74 |
| 3,252,520 | A * | 5/1966 | Hill et al. | 171/94 |
| 3,648,447 | A * | 3/1972 | Burton | 56/330 |
| 3,656,529 | A * | 4/1972 | Vadas | 426/482 |
| 3,826,185 | A * | 7/1974 | Vadas | 99/548 |
| 3,890,775 | A * | 6/1975 | Bruel | 56/330 |
| 3,981,127 | A * | 9/1976 | Smith | 56/328.1 |
| 4,022,001 | A * | 5/1977 | Burton | 56/330 |
| 4,156,465 | A * | 5/1979 | Porter | 171/14 |
| 4,175,621 | A * | 11/1979 | Seem | 171/14 |
| 4,253,390 | A * | 3/1981 | Hunt et al. | 100/45 |
| 4,282,705 | A * | 8/1981 | Fontan | 56/330 |
| 4,418,521 | A * | 12/1983 | Orlando et al. | 56/330 |
| 4,860,529 | A * | 8/1989 | Peterson et al. | 56/330 |
| 5,052,170 | A * | 10/1991 | Trenkamp et al. | 56/341 |
| 5,423,166 | A * | 6/1995 | Scott | 56/330 |
| 5,480,353 | A * | 1/1996 | Garza, Jr. | 460/148 |
| 5,495,708 | A * | 3/1996 | Scott et al. | 56/329 |
| 5,660,033 | A * | 8/1997 | Korthuis et al. | 56/330 |
| 6,070,402 | A * | 6/2000 | Korthuis et al. | 56/330 |

(Continued)

*Primary Examiner* — Eric Stapleton
(74) *Attorney, Agent, or Firm* — Egbert Law Offices, PLLC

(57) ABSTRACT

Stalk separator for the de-stalking of small fruit picked in bunches, in particular for the de-stalking of grapes. The invention includes a conveyor belt and a de-stalking device positioned above this conveyor belt. The de-stalking device includes at least two spaced assemblies positioned opposite each other, each assembly featuring a number of stacked separator arms. The mechanical drives communicate a high frequency oscillating movement to the assemblies of stacked separator arms.

10 Claims, 10 Drawing Sheets

(56) References Cited

U.S. PATENT DOCUMENTS

| | | | |
|---|---|---|---|
| 6,145,291 A * | 11/2000 | Jarmain | 56/330 |
| 6,412,260 B1 * | 7/2002 | Lukac et al. | 56/327.1 |
| 7,080,498 B2 * | 7/2006 | Etcheverry | 56/328.1 |
| 7,412,817 B2 * | 8/2008 | Flora et al. | 56/328.1 |
| 7,640,091 B2 * | 12/2009 | Berg et al. | 701/50 |
| 2003/0167746 A1 * | 9/2003 | Pellenc et al. | 56/330 |
| 2006/0101798 A1 * | 5/2006 | Ramero | 56/330 |
| 2007/0289842 A1 * | 12/2007 | Damhuis | 198/434 |

* cited by examiner

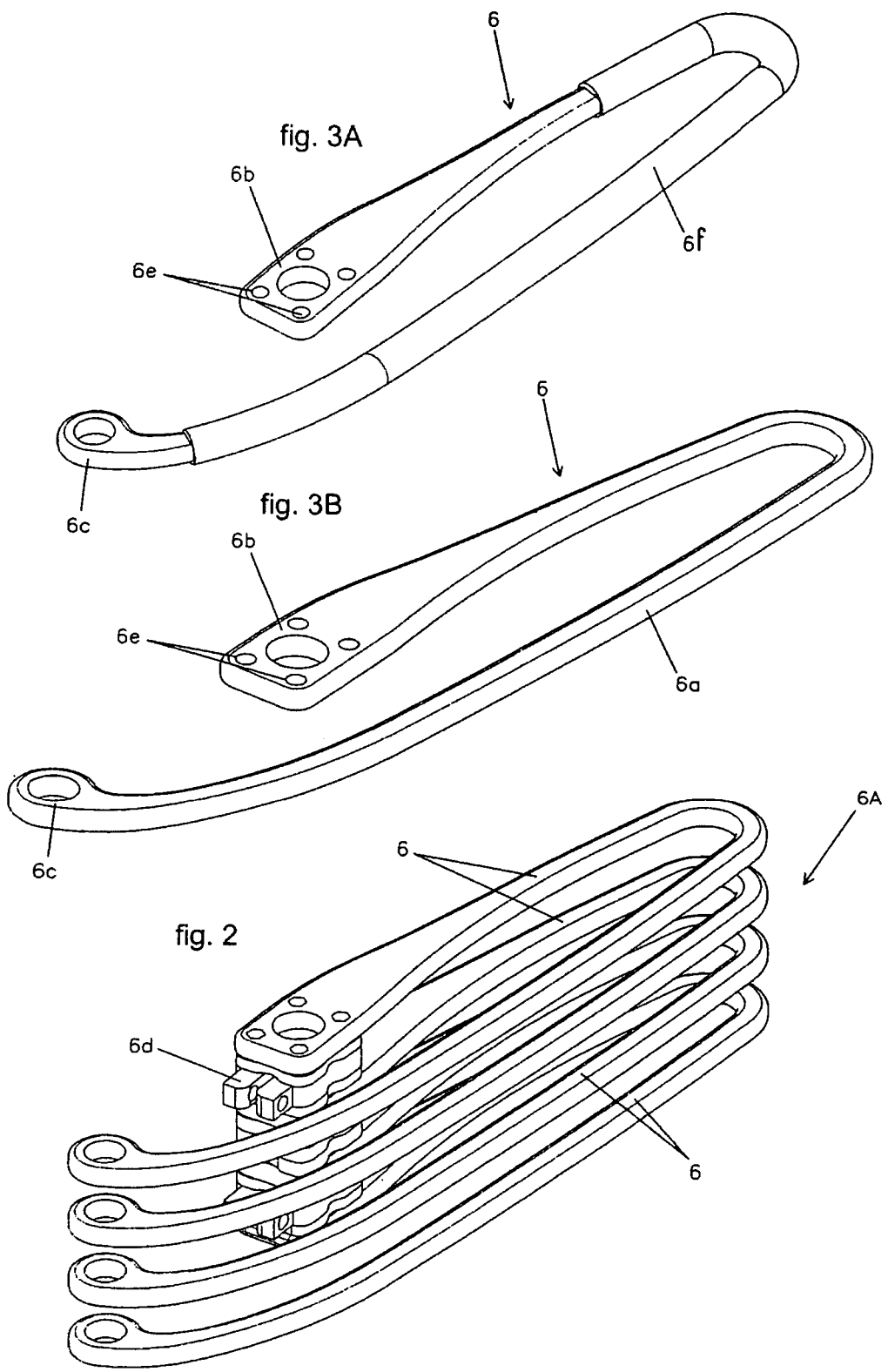

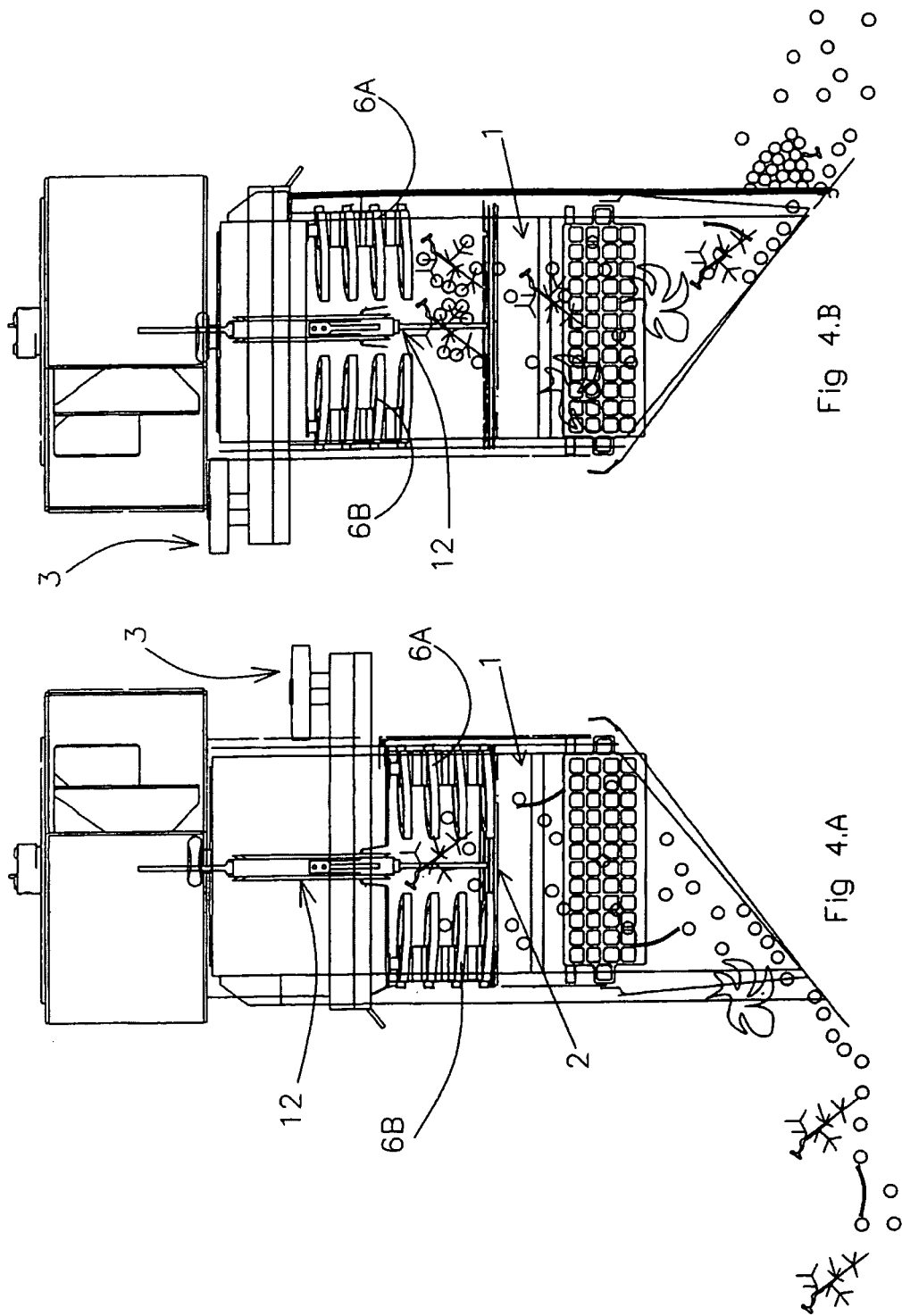

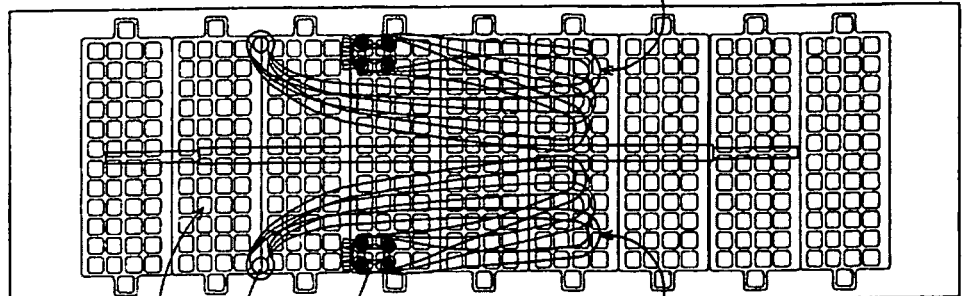
Fig 5.A
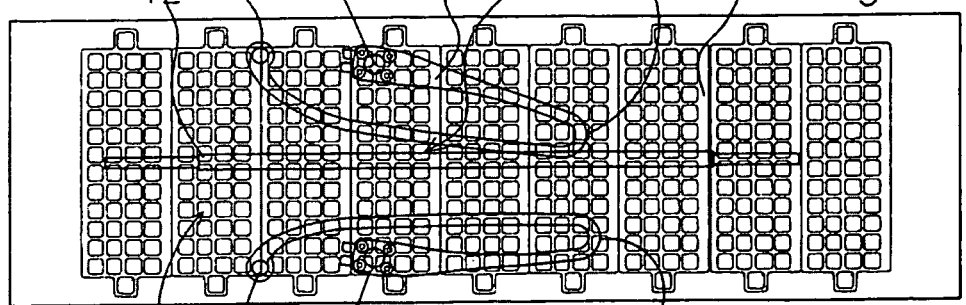
Fig 5.B
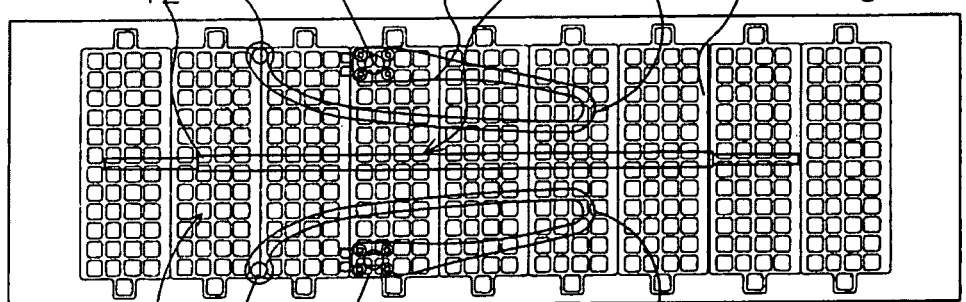
Fig 5.C
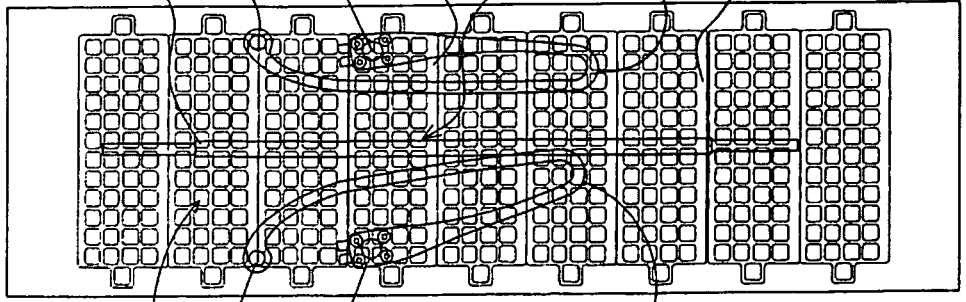
Fig 5.D

LINEAR STALK SEPARATOR WITH ALTERNATING OSCILLATING MOVEMENTS

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention concerns a linear stalk separator with alternating oscillating movements.

More precisely, it concerns a stalk separator for the de-stalking of small fruit harvested in bunches, in particular, for the de-stalking of grapes.

2. Description of Related Art Including Information Disclosed Under 37 CFR 1.97 and 37 CFR 1.98

In most applications of wine-making or vinification, grapes are first de-stalked before the crop is mashed. The aim of this operation is to detach the berries from the bunches of grapes, thereby, to separate berries from the stalks to which they are attached. In this way, the presence of bitterness and of herbaceous and plant material taste in the wine is avoided.

Various types of apparatus are known which allow de-stalking of small fruit presenting themselves in the form of bunches, likes grapes in particular.

French Patent Document FR-2 669 193, for instance, describes a grape stalk separator-sorter which includes a rotating cylindrical drum with a horizontal or slightly inclined axis. This rotating drum is provided with perforations so as to form a sieve capable of letting the berries pass which have been stripped off the stalks by the action of a rotating scraper roll mounted in said drum and consisting of a shaft on which are fastened radial pegs that are helicoidally implanted along said shaft.

The drum and the spiked roll rotate in the same direction at different speeds or in opposite directions. This rotation allows separating the grapes from the stalks. The grapes are fed into one of the ends of the drum. The berries and the juice pass through the perforations of the drum and are ejected at the other end of the drum.

European Patent Document EP-1 002 467 describes a machine that is specifically made for de-stalking grapes and consists of a linear or plane de-stalker, consisting on the one hand of an endless open conveyor belt on which the fruit to be de-stalked is transported and, on the other hand, a succession of spiked rolls (generally three or four in the machines produced according to this document) that are positioned transversally above said conveyor belt. These spiked rolls turn at a speed proportional to the forward travel speed of the open conveyor belt. The effect of these two movements is to separate the berries from the stalks. The berries and the juice pass through the screen formed by the open conveyor belt, whereas the grape stalks are ejected at the end of said conveyor belt.

The devices described in the two aforementioned documents present several major drawbacks, such as:
- excessive crushing of the berries which produced juice;
- a fairly large space requirement;
- constructive complexity;
- high cost; and
- limited reliability.

Also known (see French patent documents FR-2.511.849 and 2.516.755) is a grape de-stalking machine operating through the agitation of the grapes on an oscillating grid, by means of agitator fingers located along the travel of the grapes moving back and forth in the cross direction.

The drawback of such a machine, aside from its low output, is to turn the grapes into pulp which hinders the separation and elimination of various debris contained in it (fragments of leaves, small pieces of wood, leaf stalks, small insects, etc. because of the sticky consistency of the pulped grapes.

BRIEF SUMMARY OF THE INVENTION

The present invention proposes a de-stalking machine or stalk-stripper that does not have any of the above drawbacks.

This machine includes a conveyor belt and a de-stalking device placed above this conveyor belt. It is especially remarkable in that the de-stalking device is constituted by at least two berry-stripping assemblies that are spaced and positioned across from each other, these assemblies including each a number of stacked separator arms, and by drive elements that permit transmission of a high frequency oscillating motion to said stacked separator arm assemblies.

According to another characteristic arrangement, the drive elements of the assembly or of each oscillating assembly of stacked arms or agitators are configured so as to communicate to the latter an oscillating motion of a frequency between 5 and 30 Hertz.

According to an advantageous arrangement, the separator arms of the opposing oscillating assemblies are driven by a single angular, parallel or approximately parallel movement during the operation.

According to another characteristic arrangement, the oscillating assemblies of the stalk-separating device are separated by a space, the width of this space corresponding approximately to the width of the conveyor belt, at the inlet of said device. But this space then becomes narrower towards the outlet of the latter.

According to another characteristic arrangement, the stalk separator, according to the invention, includes a raking device which accompanies the grapes during their passage between the stalk separating assemblies.

According to another characteristic arrangement, the conveyor belt consists of an open belt.

BRIEF DESCRIPTION OF THE SEVERAL VIEWS OF THE DRAWINGS

The aims, characteristics and advantages cited above and still others will appear more clearly from the following description and the attached drawings.

FIG. 2 is a perspective view of an assembly of oscillating separator arms.

FIG. 3A is a perspective view of a first mode of execution of one of the oscillating separator arms of this assembly.

FIG. 3B is a perspective view of a second mode of execution of such an arm.

FIG. 4A is a rear elevation view of the stalk separator shown in operation, while FIG. 4B is an analog schematic view of said stalk separator in the out-of-operation position.

FIGS. 5A-5D are schematic views of outline sketches, illustrating the alternating oscillating movement of the separator arms, FIG. 5A showing superposition of the various positions; FIG. 5B showing one of the extreme positions, FIG. 5C representing the median position, and FIG. 5D illustrating the other remaining extreme position.

DETAILED DESCRIPTION OF THE INVENTION

Figure 1:
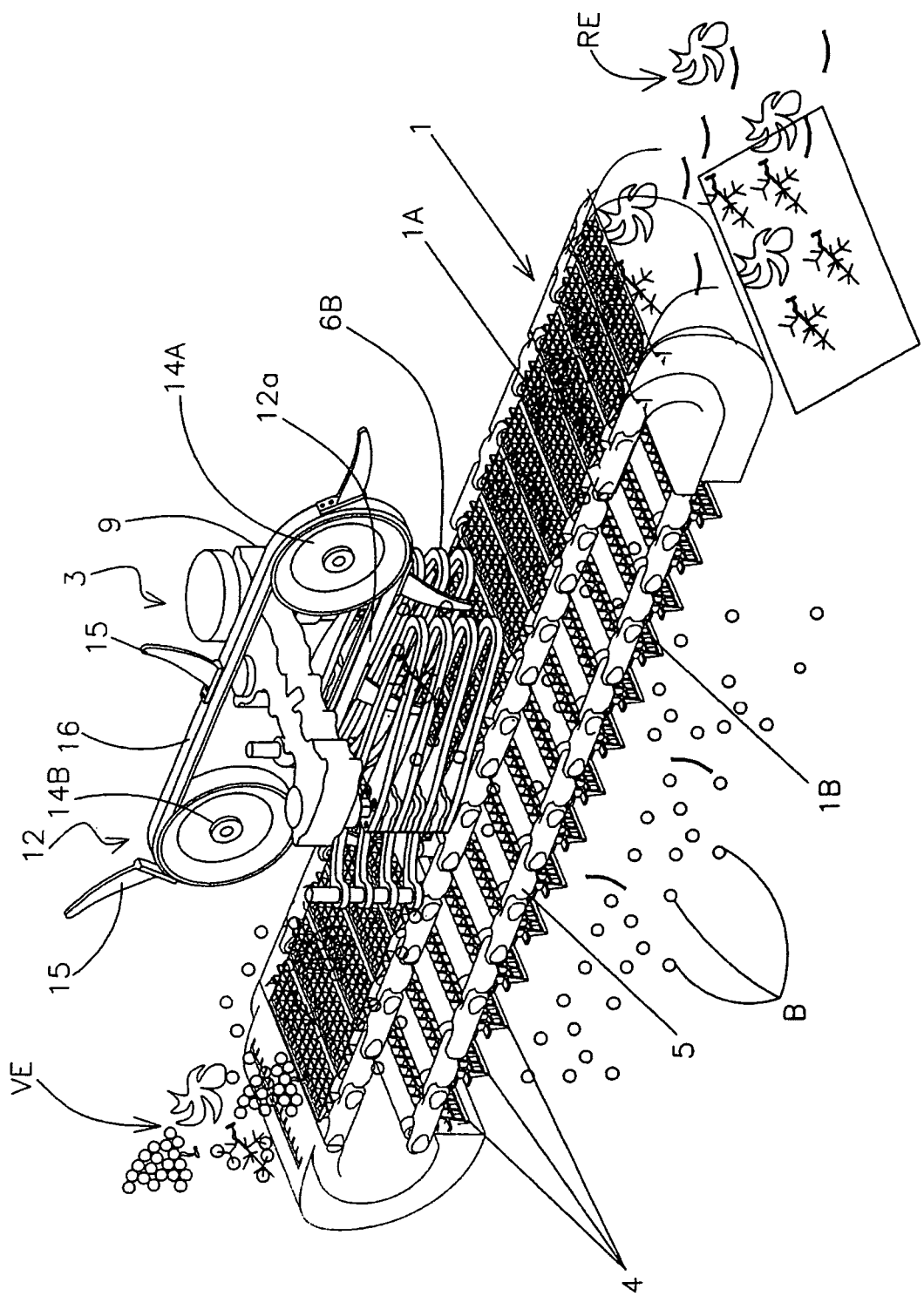
FIG. 1 is a perspective view of a production example of the stalk-separator according to the invention.
Figure 6:
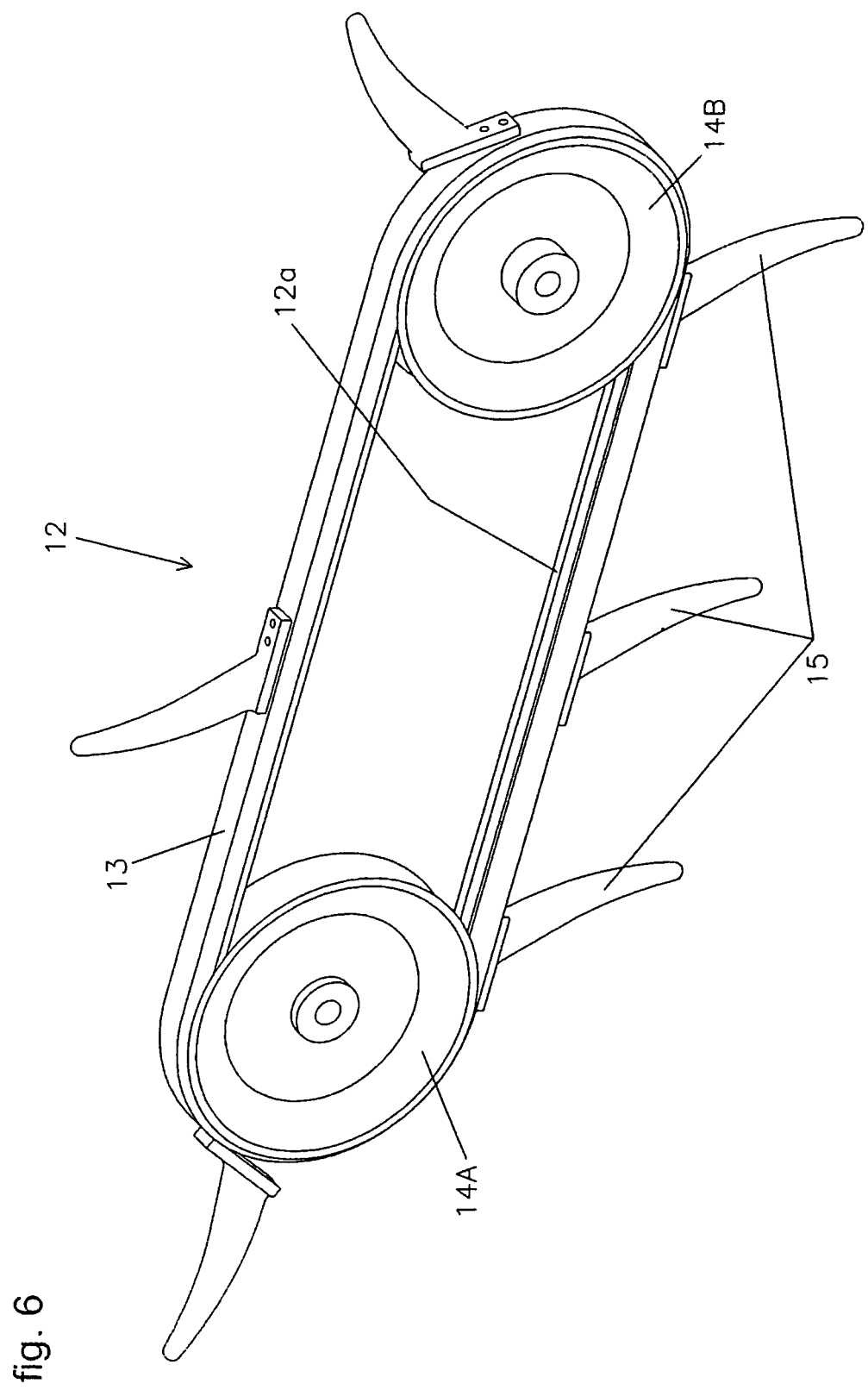
FIG. 6 is a perspective view of the fabrication of the auxiliary rake.

Reference to said drawings is made to describe an interesting, although by no means limiting, example of execution of the linear stalk separator with alternating oscillating movements according to the invention.

This stalk separator includes essentially:
a conveyor belt 1;
at least one de-stalking device 2, and
drive mechanisms 3 of this de-stalking device or each de-stalking device 2.

Preferably and advantageously, the conveyor belt is constituted by an open conveyor belt, for example, the kind of belt described in French patent document FR-2 795 599. Such a conveyor belt or sieve consists of a number of open pallets 4 mounted in succession, each of these pallets consisting of a front bar by which the pallet is attached, with the capacity to pivot, to the lateral endless chains 5 of the conveyor sieve. The pivoting pallets have, in a direction perpendicular to their crossbar, a defined length so they find themselves, by the intermediary of their rear edge, resting on the cross bar of the following pallet, by taking an almost horizontal position when they form the upper, tight side 1A of the conveyor sieve. When they belong to the lower side 1B of the latter, they hang in a vertical position so that said lower side 1B presents a mesh or openings that are very much enlarged.

A stalk separating device 2 is placed above the conveyor sieve, preferably above the median portion of the latter.

According to an important characteristic arrangement of the invention, this stalk separator is constituted by at least two berry detaching assemblies, separated by a vertical space and positioned opposite of each other. These assemblies 6A, 6B each include a number of stacked separator arms 6, and drives 3 which are capable of communicating a high frequency oscillating movement to each of said separator arm assemblies 6.

According to an advantageous mode of execution, each separator arm 6 is formed by a rigid or semi-rigid flexible shaft in the shape of a hairpin with arms of unequal length, so as to present a flattened elliptical shape constituted by an active frontal portion 6a and a rear portion 6b. The end of portion 6b is rigidly fastened to a vertical mobil shaft 7 which makes it possible to communicate oscillating movements to it, whereas the bent end 6c of the front portion is fastened, so it can pivot or not, on a fix vertical shaft 8.

The separator arms 6 may be made of any rigid or semi-rigid flexible material such as, for example, plastic materials (polyamide 66 or other) carbon fiber, aramid resin fiber (Kevlar: trademark), steel, stainless steel, titanium or a compound of several of these materials. Their section may also be very diverse, for example circular, square or rectangular, hexagonal, solid or hollow, tubular or cylindrical. Their shape or profile may be more or less elliptical, as shown, or linear or other. The active frontal portion 6a of the separator arms 6 may be advantageously covered with a layer of soft material 6f (for example a layer of polyurethane) implanted by over moulding or some other method (FIG. 3A).

The stacked separator arms 6 constituting each of the two opposite assemblies 6A, 6B of the stalk separating system, may be assembled with spacer shims 6d or through the intermediary of screws going through holes 6e presented by their end 6b or by an over molding technique known per se.

The assemblies 6A, 6B of separator arms 6 are positioned face to face and are put into an alternating pivoting motion through the intermediary of the mobile shaft 7 integral in rotation of the end 6b of said separator arms 6. The other end 6c of the latter may be linked, with the ability to pivot freely or in a fixed manner, to shaft 8. Conceivably the two shafts 7 and 8 could be driven to be in an alternating rotating movement.

The separator arm assemblies 6A, 6B are fixed on the mobile arms 7 by flanging, press fit, over molding or some other method.

According to another characteristic arrangement, the drives 3 of the oscillating assembly or assemblies of the stacked separator arms 6A, 6B, are chosen and configured to communicate to the latter an oscillating movement with a frequency between 5 and 30 Hertz.

On the other hand, according to another advantageous arrangement, the separator arms 6 of the oscillating assemblies 6A, 6B opposite each other, are powered by a single angular, parallel or approximately parallel movement when in operation. This movement is illustrated in FIGS. 5A to 5D.

FIG. 5B shows one of the extreme positions of the separator arm assemblies 6A and 6B. FIG. 5c shows the median position of these separator arm assemblies, whereas FIG. 5D illustrates the extreme position opposite the latter. These three positions are shown in superposition on FIG. 5A.

Figure 7:
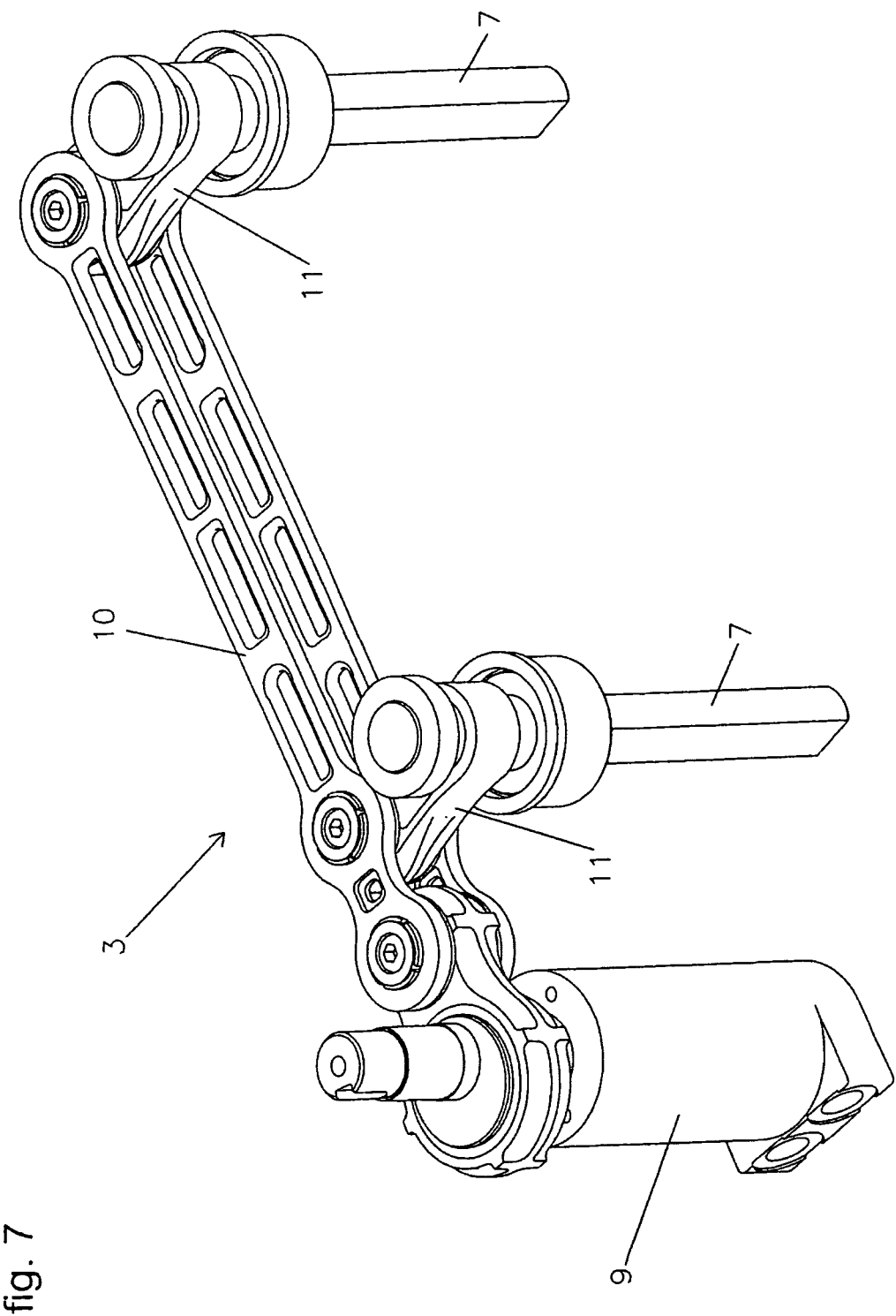
FIG. 7 is a perspective view of the drive system of the stalk separator assemblies.

FIG. 7 shows an example of execution of the drive elements 3 of the oscillating arm separator assemblies 6A, 6B of the stalk separating device. This drive system 3 includes an actuator 9 connected to the mobile shafts 7 by a connecting rod 10 and slave connecting rods 11. The actuator 9 may be of a linear or rotating, type, hydraulic, electric or other. It may be connected to the oscillating shafts 7 by any suitable transmission, for example by a pitman (connecting rod), or a rack-and-pinion system or by two opposing jacks.

The arm separator assemblies 6A, 6B are separated by a space or a chute 18, as shown on FIGS. 5A to 5D. At the entrance 19 of the de-stalking device 6A-6B, this space is of a width L which corresponds approximately to the width of the conveyor belt 1. It then becomes narrower in the direction of the outfeed or outlet of said de-stalking device, so as to form a kind of funnel to allow the grapes being transported on said conveyor to be channeled and thus to obtain a progressive de-stalking of the grapes as the crop moves forward.

According to another characteristic arrangement, the stalk separator according to the invention includes yet another raking device 12 whose function it is to complete the conveying action of the conveyor belt 1, in order to move the grape crop forward between the oscillating assemblies 6A, 6B of the de-stalking device.

This raking device can be constituted by a rotating actuator system which puts into motion one or more pushers which may be made of plastic material, of steel, carbon fiber, or glass or aramid resin, fastened on a CG type chain, a handling chain with supple links and rollers etc. According to the example shown, it is formed by a number of spaced curved fingers 15, fastened on a V-belt 13 running over two pulleys 14A, 14B. One of the pulleys is the drive pulley, which can be put in rotation by any suitable motorization system. The pushers 15 circulate between the de-stalking assemblies 6A, 6B when they belong to the lower, slack side of the rake 12.

The operation of the stalk separator according to the invention is designed as follows herein.

Figure 8:
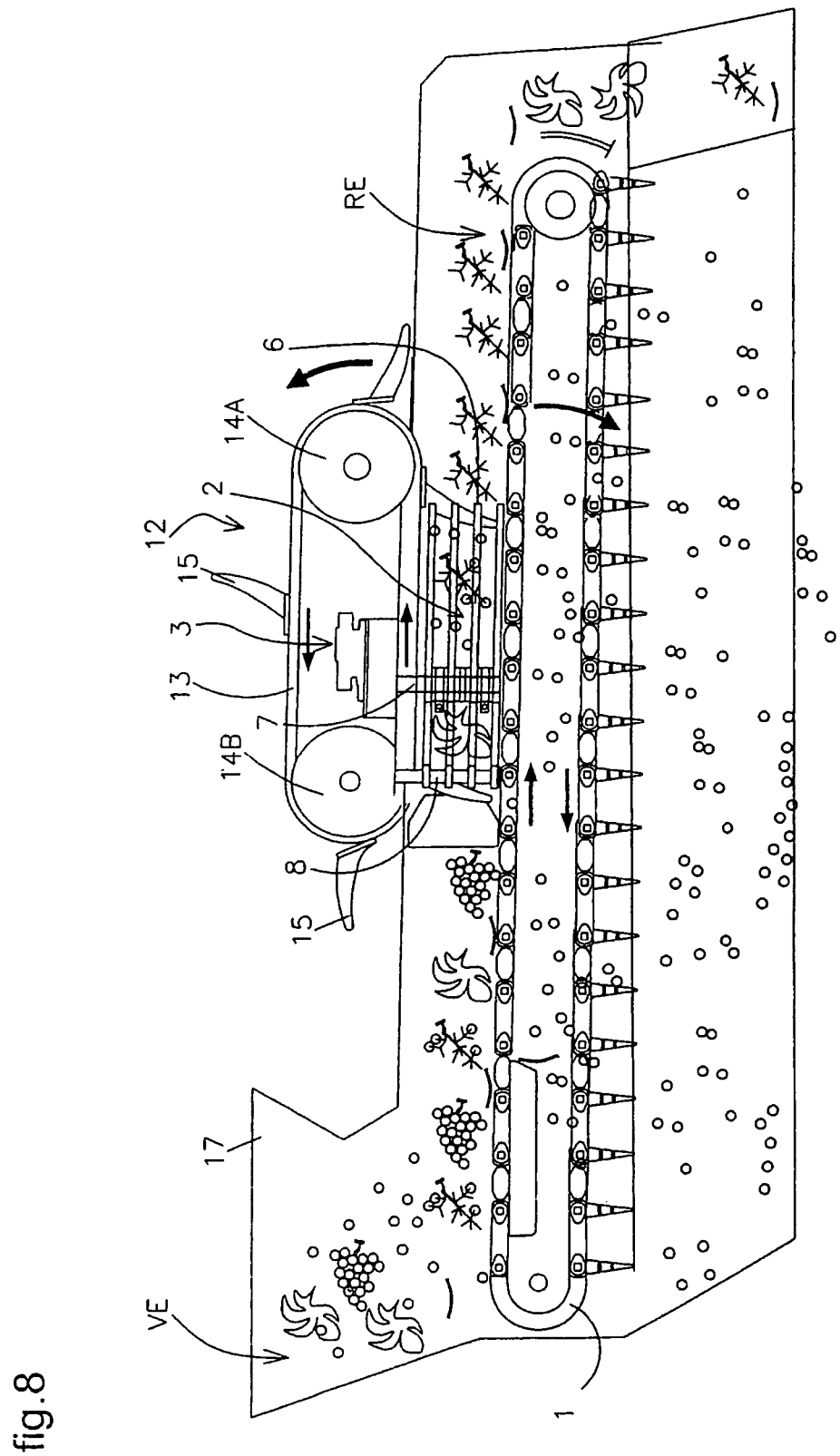
FIG. 8 is a side elevation view of an example of execution of the stalk separator which includes an open conveyor belt and a feed hopper.

The grapes VE coming from a grape-picking machine or from manual grape gathering are dumped in their raw state or after a sorting operation to remove leaves and other undesirable elements, on the upstream portion of the upper tight side 1A of the open conveyor belt, for example by an elevator belt 16 (FIG. 9) or by a hopper 17 which may form a compact assembly with the stalk separator as shown in FIG. 8.

The upstream portion of the open conveyor belt allows, right away, extracting the juice and the berries already detached from the stalks.

The fruit thus lightened and reduced in volume, is then transported by the conveyor-sieve formed by the open conveyor belt 1, and with the help of the rake 12, to the de-stalking device 2 and channeled between the oscillating separator arm assemblies 6A-6B of the latter. Under the action of the separator arms 6 of said oscillating assemblies, the berries B are detached from the stalks and drop through the mesh of the conveyor-sieve 1 and are recovered above the latter. The stalks and other undesirable elements RE are ejected at the outfeed or outlet of the conveyor-sieve (FIGS. 1 and 8).

According to another mode of execution which involves a closed conveyor belt, the detached berries and the stalks are evacuated together at the end of the conveyor belt and are then treated in a manual or automated sorting operation.

Figure 9:
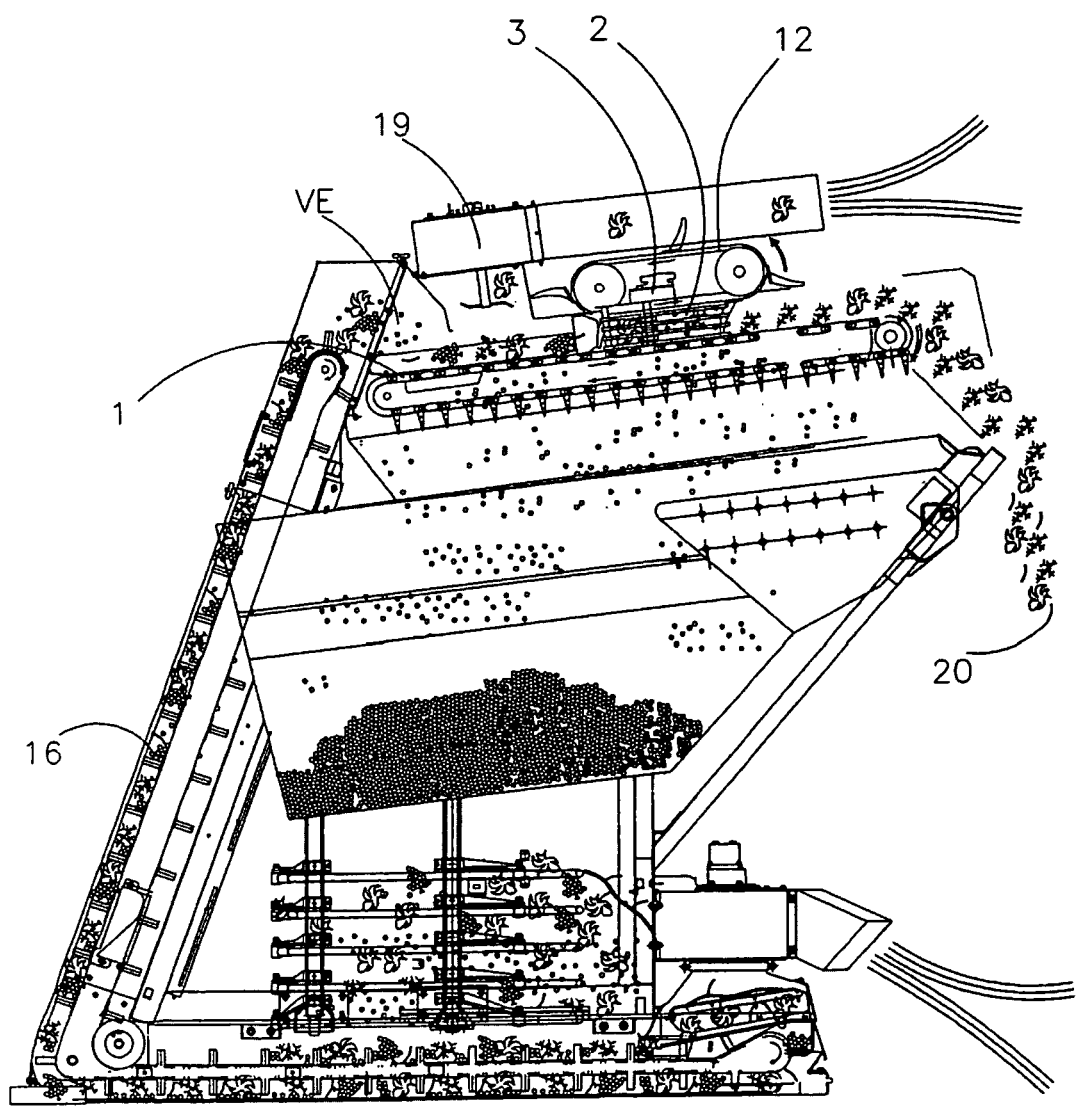
FIG. 9 is a side elevation view showing the installation of the stalk separator on a grape-picking machine.
Figure 10:
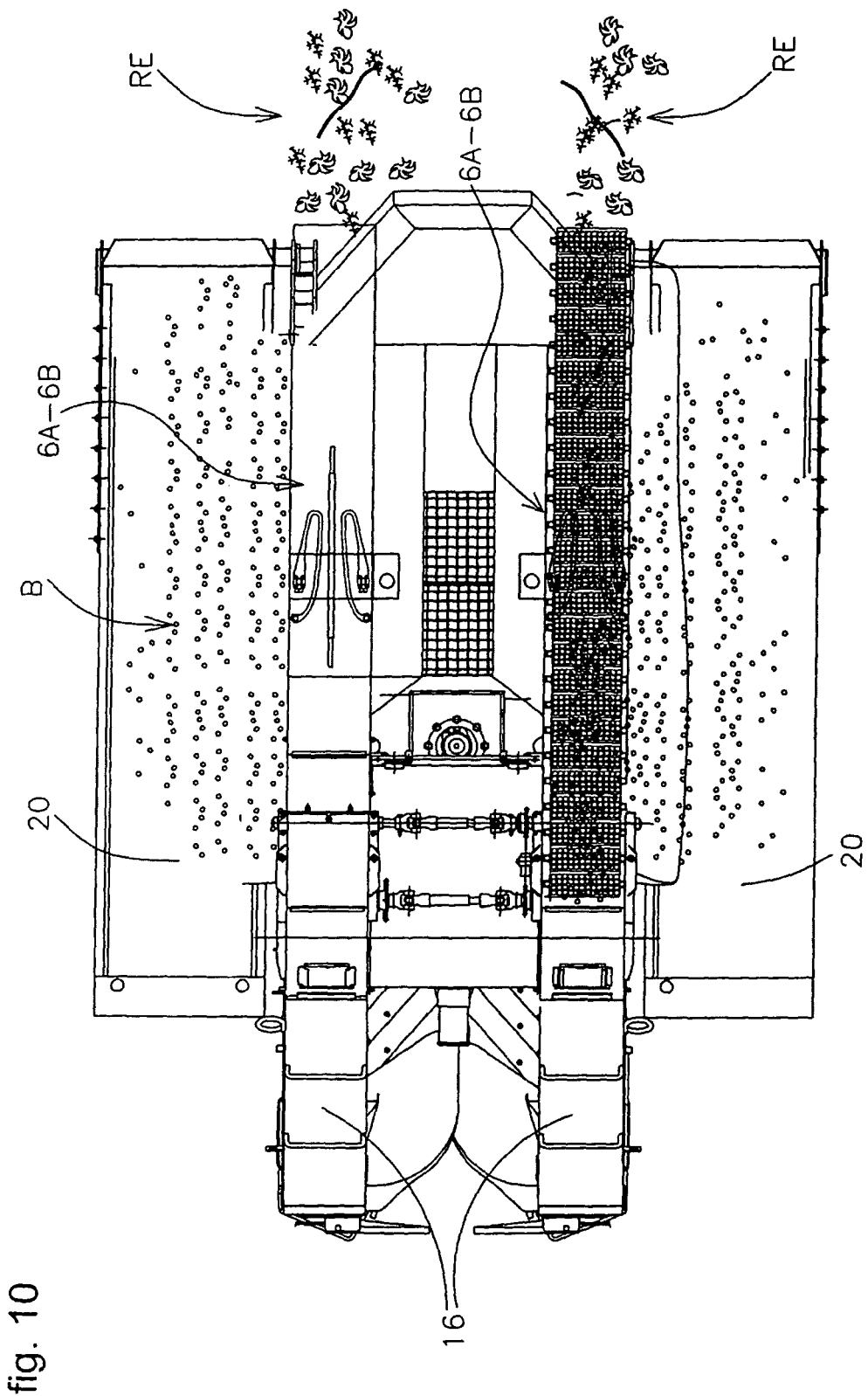
FIG. 10 is a top plan view of this machine.
Figure 11:
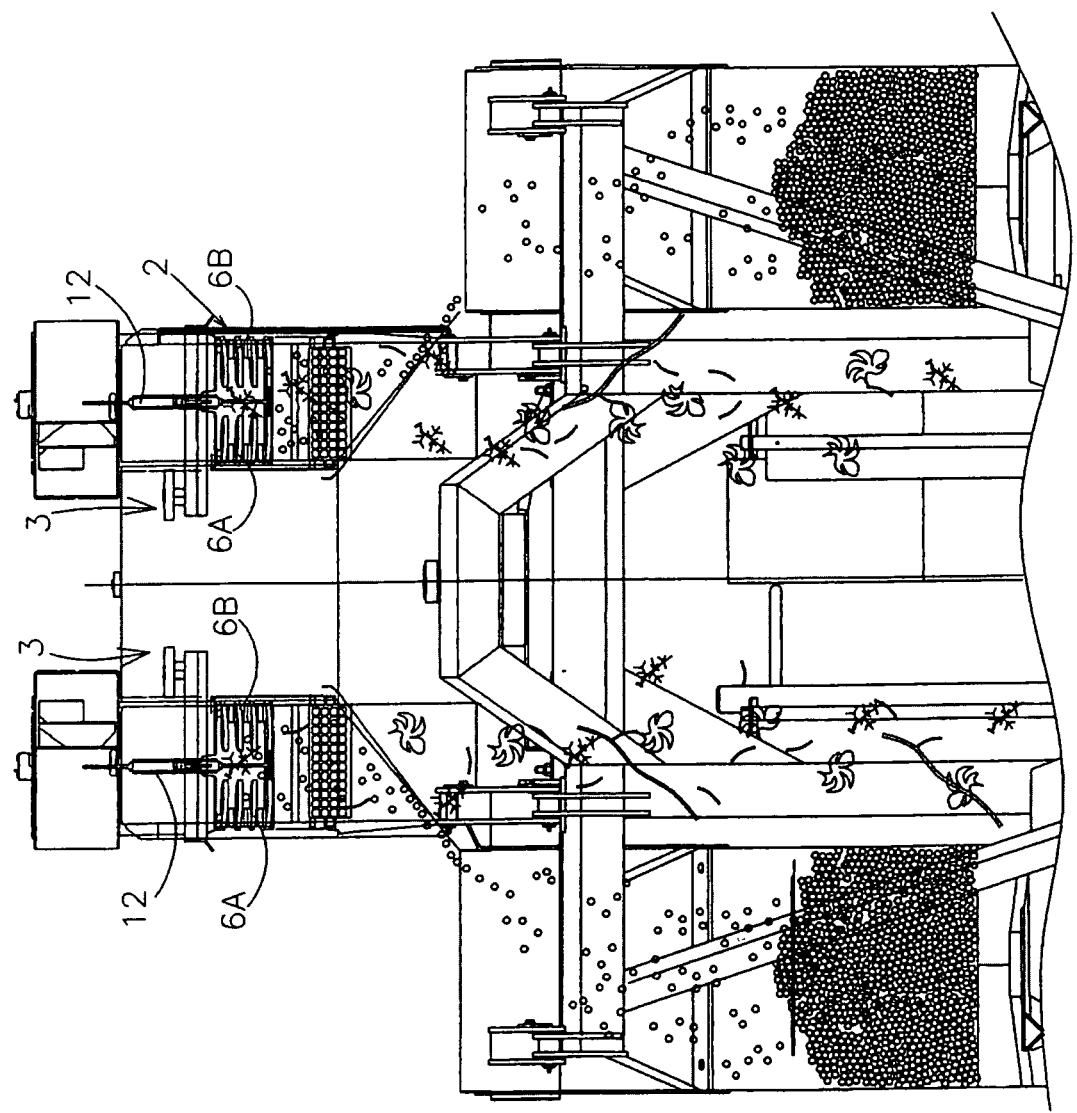
FIG. 11 is a rear elevation view of the grape-picking machine shown in FIGS. 9 and 10.

The stalk separator according to the invention may be installed on a grape-picking or analog harvesting machine, as shown on FIGS. 9 to 11, or it may be installed in a wine cellar or any other premises adapted to receiving the harvested grapes.

On FIGS. 9 to 11, the following references designate the following mechanisms of the grape-picking machine on which the stalk separator 1-2 according to the invention has been installed:

16: elevator belt
18: grape-picking device
19: leaf-ejecting vacuum equipment
20: receiving bins for berries B that have been detached from the grape stalks The invention concerns also grape-picking machines equipped with a stalk separator which features the aforementioned characteristics and is installed downstream of its elevator conveyor or conveyors 16.

We claim:

1. An apparatus for the de-stalking of small fruit picked in bunches after harvesting, the apparatus comprising:
   a flow mechanism for moving the harvested fruit bunches in a flow from an infeed toward an outfeed;
   a de-stalking mechanism positioned above said flow mechanism, said de-stalking mechanism having at least two berry-detaching assemblies positioned opposite each other and separated by a space forming an open chute, said space being between adjacent surfaces of said at least two berry-detaching assemblies, said space having an infeed end at one end of the two berry-detaching assemblies and an outfeed end at an opposite end of the two berry-detaching assemblies, said space narrowing from said infeed end toward said outfeed end, each of the berry-detaching assemblies having a plurality of separator arms with each arm extending in a plane in spaced relationship and with all arms stacked in a direction perpendicular to their respective planes, each pair of opposed berry-detaching assemblies interacting laterally with the passing fruit bunches over approximately a width of the flow; and
   a mechanical drive connected to or interconnected to the berry-detaching assemblies so as to impart a high frequency oscillating movement to said plurality of stacked separator arms.

2. The apparatus of claim 1, said flow mechanism being an open belt conveyor.

3. The apparatus of claim 1, said plurality of stacked separator arms having an generally parallel movement.

4. The apparatus of claim 1, said mechanical drive imparting an oscillating movement of a frequency of between 5 and 30 Hertz to the berry-detaching assemblies.

5. The apparatus of claim 1, each of said plurality of stacked separator arms having a flexible shaft of a hairpin shape with arms of unequal lengths, each of said plurality of stacked separator arms having a frontal portion and a rear portion, each of said plurality of separator arms being attached to a vertical shaft.

6. The apparatus of claim 5, said frontal portion being covered by a layer of supple material.

7. The apparatus of claim 1, the berry-detaching assemblies being separated from each other by a distance approximately equal to a width of said flow mechanism at said infeed.

8. The apparatus of claim 1, further comprising:
   a raking device cooperative with said flow mechanism so as to accompany the small fruit during a passage between the berry-detaching assemblies.

9. The apparatus of claim 8, said raking device having at least one pusher fastened on a drive belt extending between a pair of pulleys, one of said pair of pulleys being a drive pulley, the pusher circulating between said berry-detaching assemblies.

10. A harvesting machine for small fruit in the form of bunches comprising a stalk separator in accordance with claim 1 installed downstream of an elevator conveyor.

\* \* \* \* \*